United States Patent
Johnson et al.

(10) Patent No.: US 10,423,387 B2
(45) Date of Patent: Sep. 24, 2019

(54) METHODS FOR HIGHLY EFFICIENT DATA SHARDING

(71) Applicant: Interana, Inc., Redwood City, CA (US)

(72) Inventors: Robert Johnson, Redwood City, CA (US); Boris Dimitrov, Redwood City, CA (US)

(73) Assignee: Interana, Inc., Redwood City, CA (US)

( * ) Notice: Subject to any disclaimer, the term of this patent is extended or adjusted under 35 U.S.C. 154(b) by 0 days.

(21) Appl. No.: 15/684,210

(22) Filed: Aug. 23, 2017

(65) Prior Publication Data

US 2018/0060037 A1 Mar. 1, 2018

Related U.S. Application Data (60) Provisional application No. 62/378,603, filed on Aug. 23, 2016.

(51) Int. Cl.
| | | |
|---|---|---|
| *G06F 16/00* | (2019.01) | |
| *G06F 7/08* | (2006.01) | |
| *G06F 16/22* | (2019.01) | |
| *G06F 16/23* | (2019.01) | |
| *G06F 16/27* | (2019.01) | |

(52) U.S. Cl.
CPC ............ *G06F 7/08* (2013.01); *G06F 16/2282* (2019.01); *G06F 16/2379* (2019.01); *G06F 16/278* (2019.01)

(58) Field of Classification Search
CPC .. G06F 7/08; G06F 17/30339; G06F 17/3077; G06F 16/2379; G06F 16/2282; G06F 16/278
See application file for complete search history.

(56) References Cited

U.S. PATENT DOCUMENTS

| | | | |
|---|---|---|---|
| 5,335,345 A | 8/1994 | Frieder et al. | |
| 5,668,987 A | 9/1997 | Schneider | |
| 5,893,090 A | 4/1999 | Friedman et al. | |
| 5,978,791 A | * 11/1999 | Farber ............... | G06F 17/30091 |
| | | | 707/640 |
| 6,606,618 B2 | 8/2003 | Delo | |
| 6,775,681 B1 | 8/2004 | Ballamkonda et al. | |
| 7,010,521 B2 | 3/2006 | Hinshaw et al. | |
| 7,213,012 B2 | 5/2007 | Jakobsson et al. | |
| 7,587,394 B2 | 9/2009 | Chang et al. | |
| 7,617,235 B2 | 11/2009 | Srinivasan et al. | |
| 8,239,383 B2 | 8/2012 | Santosuosso | |
| 8,756,209 B2 | 6/2014 | Do et al. | |

(Continued)

FOREIGN PATENT DOCUMENTS

| | | |
|---|---|---|
| JP | 10232804 | 9/1998 |
| JP | 10-26248 | 10/1998 |

(Continued)

*Primary Examiner* — Sherief Badawi
*Assistant Examiner* — Lahcen Ennaji
(74) *Attorney, Agent, or Firm* — Jeffrey Schox (57) ABSTRACT

A method for highly efficient data sharding includes: receiving a dataset containing event data; identifying a classifier field of the dataset; identifying an event field of the dataset; generating a data structure for the dataset using the classifier field and the event field; and storing the dataset by partitioning the dataset into shards using the classifier field as a shard key and ordering data within each shard by the classifier field.

20 Claims, 4 Drawing Sheets

(56) References Cited

U.S. PATENT DOCUMENTS

| | | | |
|---|---|---|---|
| 8,768,870 | B1 | 7/2014 | Corrado et al. |
| 8,856,169 | B2 | 10/2014 | Zhang et al. |
| 8,868,580 | B2 | 10/2014 | Gould et al. |
| 8,965,915 | B2 | 2/2015 | Ganti et al. |
| 9,053,167 | B1* | 6/2015 | Swift ............... G06F 17/30575 |
| 9,171,104 | B2 | 10/2015 | Gotz et al. |
| 9,246,932 | B2 | 1/2016 | Gorny et al. |
| 9,424,351 | B2 | 8/2016 | Risvik et al. |
| 9,900,337 | B2 | 2/2018 | Gorny et al. |
| 2001/0032199 | A1 | 10/2001 | Delo |
| 2003/0195872 | A1 | 10/2003 | Senn |
| 2003/0212668 | A1 | 11/2003 | Hinshaw et al. |
| 2004/0143756 | A1 | 7/2004 | Munson et al. |
| 2004/0225639 | A1 | 11/2004 | Jakobsson et al. |
| 2004/0230764 | A1 | 11/2004 | Merchant et al. |
| 2004/0243568 | A1 | 12/2004 | Wang et al. |
| 2005/0055254 | A1 | 3/2005 | Schmidtberg et al. |
| 2005/0065914 | A1 | 3/2005 | Chang et al. |
| 2005/0114369 | A1 | 5/2005 | Gould et al. |
| 2005/0182762 | A1 | 8/2005 | Srinivasan et al. |
| 2005/0223019 | A1 | 10/2005 | Das et al. |
| 2006/0059439 | A1* | 3/2006 | Hao ................... G06T 11/206 715/805 |
| 2006/0069955 | A1 | 3/2006 | Oka et al. |
| 2006/0224793 | A1* | 10/2006 | Purlia ............. G06F 17/30029 710/62 |
| 2007/0118909 | A1 | 5/2007 | Hertzog et al. |
| 2007/0150949 | A1 | 6/2007 | Futamura et al. |
| 2007/0294214 | A1 | 12/2007 | Santosuosso |
| 2008/0022261 | A1 | 1/2008 | Gooding |
| 2008/0215576 | A1 | 9/2008 | Zhao et al. |
| 2008/0250497 | A1 | 10/2008 | Mullarkey et al. |
| 2010/0138919 | A1 | 6/2010 | Peng et al. |
| 2012/0036580 | A1 | 2/2012 | Gorny et al. |
| 2012/0130997 | A1 | 5/2012 | Risvik et al. |
| 2013/0091170 | A1 | 4/2013 | Zhang et al. |
| 2013/0173597 | A1 | 7/2013 | Do et al. |
| 2013/0346417 | A1 | 12/2013 | Sakurai et al. |
| 2014/0012814 | A1 | 1/2014 | Bercovici et al. |
| 2014/0108380 | A1 | 4/2014 | Gotz et al. |
| 2014/0108421 | A1 | 4/2014 | Isaacson et al. |
| 2014/0280287 | A1 | 9/2014 | Ganti et al. |
| 2015/0067860 | A1 | 3/2015 | Levow et al. |
| 2015/0347492 | A1* | 12/2015 | Dickie ............. G06F 17/30371 707/700 |
| 2016/0021122 | A1 | 1/2016 | Pevny |
| 2016/0036844 | A1 | 2/2016 | Kopp et al. |
| 2016/0080410 | A1 | 3/2016 | Gorny et al. |
| 2016/0171071 | A1* | 6/2016 | Beisiegel ......... G06F 17/30442 707/715 |
| 2017/0024452 | A1 | 1/2017 | Budalakoti et al. |
| 2017/0300490 | A1* | 10/2017 | Kachemir ......... G06F 17/3033 |

FOREIGN PATENT DOCUMENTS

| | | |
|---|---|---|
| JP | 2005100392 A | 4/2005 |
| JP | 2012-108635 | 6/2012 |
| JP | 2013196565 A | 9/2013 |
| WO | 2010018178 A1 | 2/2010 |
| WO | 2010148415 A1 | 12/2010 |
| WO | 2013016620 A2 | 1/2013 |
| WO | 2013033123 A2 | 3/2013 |

* cited by examiner

FIGURE 1

| data.event | data.classifier | data.behavior |
|---|---|---|
| 1220 | 204595 | 2341 |
| 1221 | 123411 | 123425671 |
| 1225 | 546345 | 234111 |
| 1226 | 204595 | 213434431 |
| 1228 | 123411 | 123444112344 |
| 1229 | 123411 | 351135 |

FIGURE 2A

| data.classifier | data.event | data.behavior |
|---|---|---|
| 123411 | 1221 | 123425671 |
| 123411 | 1228 | 123444112344 |
| 123411 | 1229 | 351135 |
| --- | --- | --- |
| 204595 | 1220 | 2341 |
| 204595 | 1226 | 213434431 |
| --- | --- | --- |
| 546345 | 1225 | 234111 |

| data.classifier | data.event | data.behavior |
|---|---|---|
| 123411 | 1221 | 123425671 |
| 123411 | 1228 | 123444112344 |
| 123415 | 1218 | 351135 |
| 123415 | 1220 | 2341 |
| 123419 | 1226 | 213434431 |
| 123421 | 1225 | 234111 |
| 123422 | 1226 | 213434431 |
| 123422 | 1227 | 234111 |
| 123425 | 1221 | 123425671 |
| 123425 | 1228 | 123444112344 |
| 123440 | 1218 | 351135 |
| 123440 | 1220 | 2341 |
| 123445 | 1226 | 213434431 |
| 123447 | 1225 | 234111 |
| 123447 | 1226 | 213434431 |
| 123449 | 1225 | 234111 |

| data.classifier | data.event | data.behavior |
|---|---|---|
| 123411 | 1221 | 123425671 |
| 123411 | 1228 | 123444112344 |
| 123415 | 1218 | 351135 |
| 123415 | 1220 | 2341 |
| 123419 | 1226 | 213434431 |

FIGURE 4

METHODS FOR HIGHLY EFFICIENT DATA SHARDING

CROSS-REFERENCE TO RELATED APPLICATIONS

This application claims the benefit of U.S. Provisional Application Ser. No. 62/378,603, filed on 23 Aug. 2016, which is incorporated in its entirety by this reference.

TECHNICAL FIELD

This invention relates generally to the data analytics field, and more specifically to new and useful methods for highly efficient data sharding in the data analytics field.

BACKGROUND

Businesses today collect huge amounts of data relating to sales, marketing, and other critical operations. Querying this data is often a difficult and resource intensive process, especially for many types of complex queries. To some extent, query performance can be improved by generating data aggregates and indices, but it is infeasible to do this across all dimensions in a large dataset. Because of this, query performance issues often slow data analysis. Efficient queries can be conducted by sampling techniques across large datasets, but these queries suffer in performance without enabling data structuring. Thus, there is a need in the data analytics field to create methods for efficient data sharding. This invention provides such new and useful methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. Method for Highly Efficient Data Sharding

Figure 1:
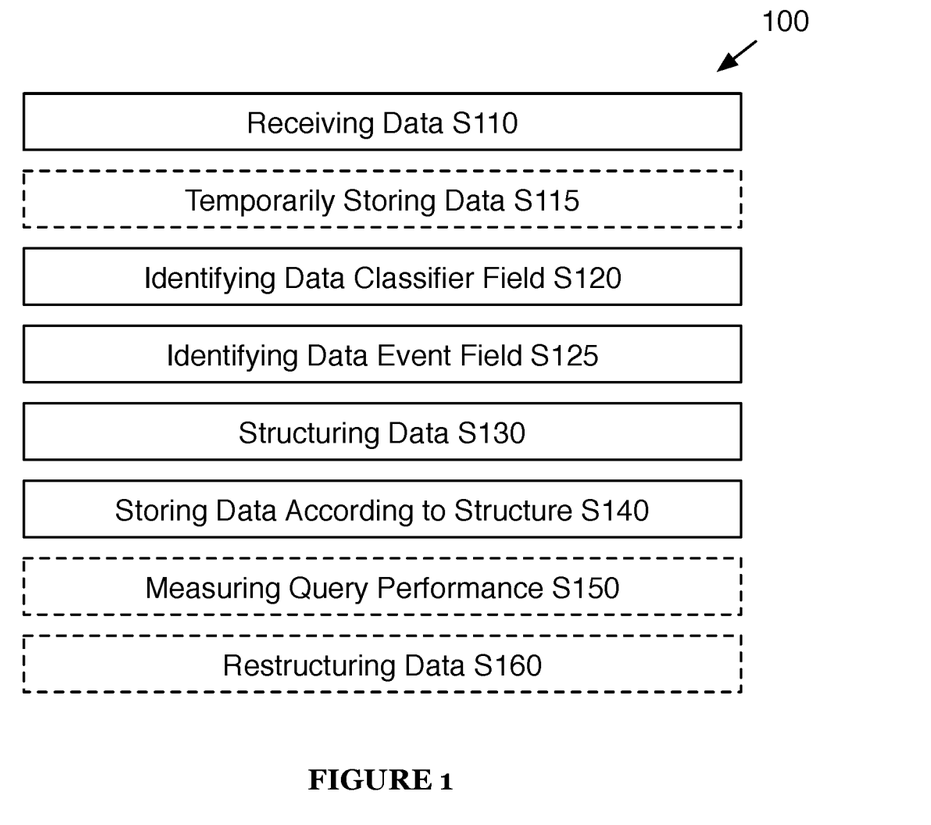
FIG. 1 is a chart view of a method of an invention embodiment.

A method 100 for efficient data sharding includes receiving data S110, identifying a classifier field of the data S120, identifying an event field of the data S125, generating a data structure using the classifier field and event field S130, and storing the data according to the data structure S140, as shown in FIG. 1. The method 100 may additionally or alternatively include temporarily storing data S115, measuring query performance S150, and/or restructuring the data S160.

The method 100 functions to structure data in a manner that enables increased query speed across large datasets in distributed computing systems. The method 100 preferably structures data (received in S110) in a distributed manner, using data sharding. In particular, the method 100 preferably includes identifying classifier and event fields of data (S120 and S125) and using these fields to perform data structuring (S130) and subsequent storage (S140), which includes determining how data is sharded and ordered. This preferably results in data organization that increases query speed for queries in which event data may be sampled or otherwise analyzed across various classifiers (e.g., if looking at user behavior for a set of users across some time period, the classifier field may include user identifiers, while the event field may include interaction times). The method 100 may additionally include transforming or otherwise modifying data during data structuring (e.g., by hashing values of the classifier field and storing according to the hashed classifier field, rather than the classifier field directly) and/or restructuring data (S160); for example, based on measured query performance (S150).

These aspects of the method 100 are directed to specific improvements in computer capabilities; the method 100 is designed to improve the way a computer stores and retrieves data in memory; potentially improving flexibility, search times, and/or memory requirements.

The method 100 preferably runs on a platform intended for rapid data analysis, such as the system for rapid data analysis of U.S. patent application Ser. No. 14/644,081, the entirety of which is incorporated by this reference.

S110 includes receiving data. S110 functions to import or otherwise collect data for which analysis is desired to one or more databases or data stores. Data imported by S110 may be from one data source (e.g., a single server streaming event data) or multiple data sources (e.g., several databases containing desired information). Data imported in Step preferably may be preferably be of any data schema; additionally or alternatively, data imported in S110 may have multiple schemas (i.e., some data imported is of a first schema, other data imported is of a second schema, etc.) or may be schema-less. Data sources may be databases, data stores, streaming data sources, or any suitable source for data. Data is preferably received over a network connection (e.g., over a LAN or over the internet), but may additionally or alternatively be received in any suitable manner (e.g., loaded from a hard drive).

S110 preferably includes importing data from one or more data sources through an application programming interface (API), but may additionally or alternatively include importing data in any other suitable manner.

In a single implementation of the method 100, S110 may be operable in multiple instances; for example, a distributed computer system might include several nodes, each operating instances of S110 (on the same data source, or on different data sources).

Data imported in S110 is preferably event data, but may additionally or alternatively be any suitable type of data. Event data entries imported by S110 preferably include timestamps or other time indicators, which may be used for preliminary ordering/storage. Data imported by S110 preferably includes at least one field suitable for classifying data (see S110) and at least one field suitable for providing event information (see S125); additionally or alternatively, data imported by S110 may include any type of data.

S115 includes temporarily storing data. S115 functions to store data prior to structuring in S130. S115 may be used, for example, if data is received in a streaming manner (e.g., event data being transmitted in real-time) to store data prior to identification of the classifier and event fields and structuring according to both of those fields.

Note that data stored in S115 may be structured prior to storage; however, the structuring performed in S115 is preferably distinct from that performed in S130 (i.e, the structuring techniques and/or outcomes are different). In general, S115 preferably includes storing data in a manner that requires reduced computational resources compared to structuring and storing using the technique of S130/S140. This reduction in processing power may result from a difference in structuring technique, simply from a difference in data scenario (e.g., if data is an event stream, it may be inefficient to organize data into non-event-related buckets, such as user ID, in real time), or for any other reason. Alternatively, S115 may include structuring and/or storing data in any manner.

S115 may additionally include performing pre-processing on temporarily stored data in any manner (e.g., filtering data, flagging data, organizing data). For example, S115 may include identifying anomalous data (e.g., data that appears to be corrupted or erroneous, data corresponding to an especially active user, etc.) and flagging the data (or keeping a record of the data, modifying that data, etc.).

Data stored in S115 is preferably stored in persistent memory (e.g. hard disk drives, flash memory), but some or all of the data may be additionally or alternatively stored in temporary memory (e.g. RAM). Data stored in S115 may be stored in physically distinct memory from data stored in S140 (e.g., the physical location of temporarily stored data may be distinct from the physical location of permanently or semi-permanently stored data); alternatively, data stored in S115 may be co-located in memory with data stored in S140.

Data stored in S115 is preferably sharded, but may additionally or alternatively be segmented or distributed in any manner.

Figure 2A:
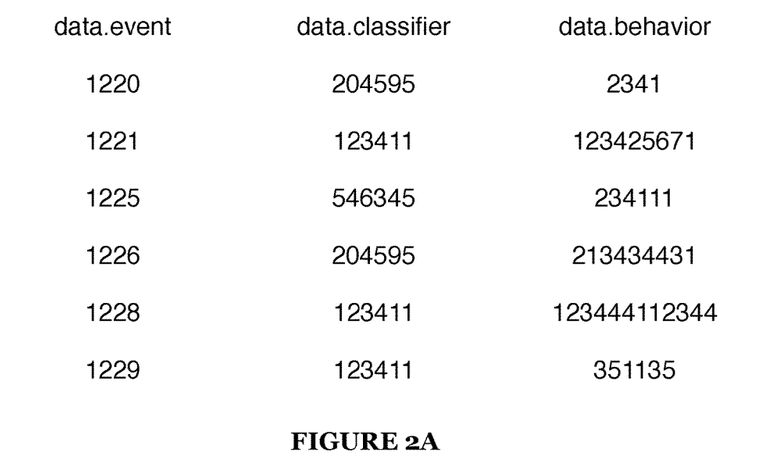
FIG. 2A is an exemplary table view of data ordered by event field values.
Figure 2B:
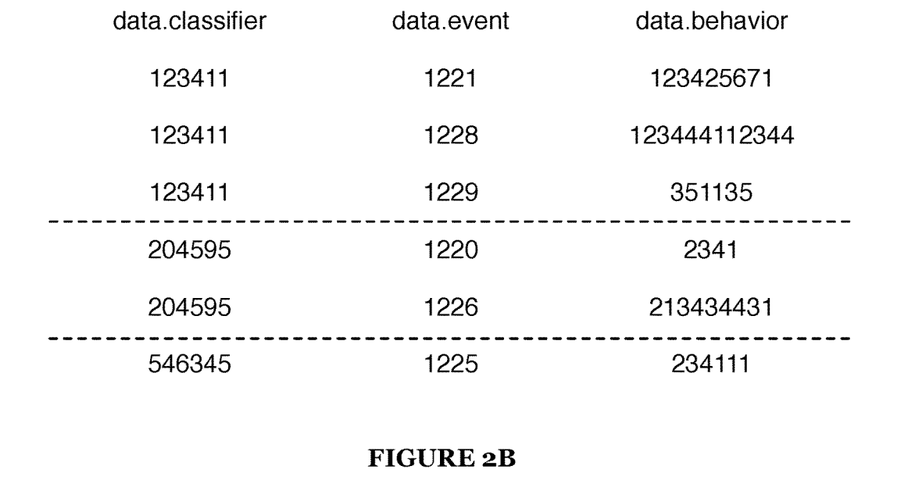
FIG. 2B is an exemplary table view of data ordered by classifier field values and then by event field values.

In one example embodiment, data stored in S115 is stored according to an event field (e.g., in order of time stamp, the event field identified in S125, etc.), as shown in FIG. 2A.

S120 includes identifying a classifier field of the data received in S110. S120 functions to identify a field that can be used to place data into one or more classes; the intent preferably being that behavior may be measured/analyzed for particular classes or across classes.

Some examples of classifier fields include user ID (UID), IP address, geographic region, MAC address, session ID, name, or any other field that data may be classified by.

As discussed in the section on S130, the classifier field preferably plays an important role in how data is structured in S130. Alternatively, the classifier field identified in S120 may play any role in data structuring in S130.

S120 preferably includes identifying a classifier field according to a manual specification (i.e., a person or ruleset has specified that a data field is a classifier field), but may additionally or alternatively include identifying a classifier field in any manner. For example, S120 may include analyzing field values or metadata to determine or estimate field type, and designating certain fields as classifier fields in response (e.g., S120 may include detecting a field that contains multiple values in the form xxx.xxx.xxx.xxx is an IPv4 field, and may designate that field as a classifier field). S120 may additionally or alternatively include analyzing past queries performed on a dataset to determine that fields containing data in a particular format is relevant to many past queries, and designating any fields containing similar data as classifier fields.

As another example, S120 may include analyzing data received in S110 relative to other data sets (or analysis of those data sets) to determine a 'data fingerprint' or 'data profile' match; that is, if it is known that the data received in S110 is similar to other data with known preferred classifier fields, those preferred classifier fields may be recommended or chosen for use in S120.

As a third example, S120 may include performing statistical analysis on the data and identifying classifier fields based on how field values are distributed (e.g., a field with a uniform distribution across a small and finite range may be interesting as a classifier field).

Note that S120 may be performed at any time. In particular, S120 may be performed before any structuring (S130) or restructuring (S160) of data. If S120 is being performed on previously structured (S130) or restructured data (S160), S120 may utilize performance data (e.g., measured in S150) or other query data to identify classifier fields. For example, S120 may include identifying that a number of queries have been performed on the data that use a particular field as a classifier field; this field may be then identified via S120 as a classifier field (from analysis of the query data).

S120 preferably includes identifying a single classifier field, but may additionally or alternatively include identifying multiple classifier fields.

S125 includes identifying an event field of the data. S125 functions to identify a field that can be used to relate the data received in S115 to states and/or changes in state; the intent preferably being that state data and/or state change data can be used to represent behavior.

Some examples of event fields include time fields and event index fields. If data received in S110 is streamed, event field values may additionally or alternatively be inferred or collected from the order and/or time of data reception (even if said order or time is not an explicit value contained within the data received).

As discussed in the section on S130, the event field preferably plays an important role in how data is structured in S130. Alternatively, the event field identified in S125 may play any role in data structuring in S130.

S125 preferably includes identifying an event field according to a manual specification (i.e., a person or ruleset has specified that a data field is an event field), but may additionally or alternatively include identifying an event field in any manner. For example, S125 may include analyzing field values or metadata to determine or estimate field type, and designating certain fields as event fields in response (e.g., S125 may include detecting a field that contains multiple values in the form hh:mm:ss is a time field, and may designate that field as an event field).

As another example, S125 may include analyzing data received in S110 relative to other data sets (or analysis of those data sets) to determine a 'data fingerprint' or 'data profile' match; that is, if it is known that the data received in S110 is similar to other data with known preferred event fields, those preferred event fields may be recommended or chosen for use in S125.

As a third example, S125 may include performing statistical analysis on the data and identifying event fields based on how field values are distributed (e.g., a field with a periodic/cyclical distribution across a seemingly unbounded range may be interesting as an event field).

Note that S125 may be performed at any time. In particular, S125 may be performed before any structuring (S130) or restructuring (S160) of data. If S125 is being performed on previously structured (S130) or restructured data (S160), S125 may utilize performance data (e.g., measured in S150) or other query data to identify event fields. For example, S125 may include identifying that a number of queries have been performed on the data that use a particular field as an event field (e.g., as range window applied to other data); this field may be then identified via S125 as an event field (from analysis of the query data).

S125 preferably includes identifying a single event field, may additionally or alternatively include identifying multiple event fields.

S130 includes structuring the data according to the classifier field and the event field. S130 functions to organize the logical and/or physical structure of data received in S110 (and potentially stored temporarily in S115) based on one or more chosen classifier fields and event fields. S130 preferably includes structuring data to improve query performance on the data specifically for queries that attempt to determine behavior or other state change information for a set of classifier field values across a range of events (selected using event field value ranges), but may additionally or alternatively include structuring data for any purpose and in any manner.

Figure 3:
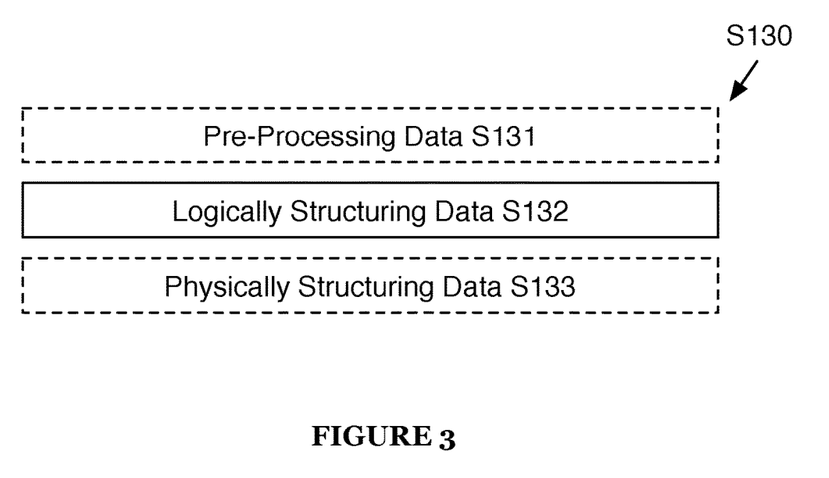
FIG. 3 is a chart view of a data structuring step of a method of an invention embodiment.

S130 preferably includes logically structuring the data S132, and may additionally include pre-processing the data S131 and/or physically structuring the data S133 as shown in FIG. 3.

S131 includes pre-processing the data prior to logical and/or physical structuring. S131 may include processing the data in any way to prepare for or otherwise aid logical and/or physical structuring (e.g., filtering, transforming, and/or organizing data).

In a first implementation of a preferred embodiment, S131 includes hashing the values of the classifier field. In this implementation, S132 includes logically structuring the data using the hashed values of the classifier field.

Hashing the classifier field includes mapping values of the classifier field to a hash space using a hashing algorithm. Preferably, this hashing algorithm distributes values of the classifier field uniformly in hash space. Since in this implementation, the data is logically structured (e.g., sharded) using the hashed values, the uniform distribution aspect of the hash space distributes read and write operations across the structure (e.g., avoiding shard 'hot spots').

In the first implementation, S131 preferably includes performing consistent hashing, but may alternatively include hashing the classifier field using any hashing technique. Consistent hashing is a special kind of hashing such that when a hash table is resized, only K/n keys need to be remapped on average, where K is the number of keys, and n is the number of slots. S131 preferably includes selecting a hashing algorithm that reduces or eliminates the probability of hash collisions (e.g., by analyzing data received in S110 and/or previously stored data), but may additionally or alternatively include selecting a hashing algorithm in any manner. For example, S131 may include analyzing a classifier field of a dataset (either the entire dataset, or a sample of the dataset), determining a distribution of the classifier field values, and selecting or generating a hashing algorithm based on maximizing the uniformity of the values once transformed into hash space.

S132 includes logically structuring the data. S132 functions to determine how data should be represented in a database and/or data store. S132 preferably includes sharding data. Splitting datasets into shards allow the shards to be distributed across computers in a distributed computing system. Nodes of the distributed computing system preferably store parts of the data contained by a dataset (e.g., one or more shards).

Shards are preferably both horizontal and vertical table partitions; data shards are preferably formed from the intersection of a subset of all rows and a subset of all columns of a data table. Each shard preferably contains at least time information, but may additionally or alternatively contain other information.

Shards are preferably partitioned by one or more classifier fields (e.g., the hashed classifier field described previously); for example, each data shard may contain a set of events occurring across a range of (hashed) UIDs. Shards may be additionally partitioned by one or more event fields; for example, a shard may include a set of events occurring across a range of hashed UIDs and occurring during some time range.

Shards may additionally or alternatively be partitioned by any other suitable information (e.g. location, IP address, session ID, etc.). Shard partitioning is preferably done by the following rules: vertical partitions preferably include a fixed number of fields, and there are a fixed number of horizontal partitions for each vertical partition.

For example, if a dataset includes a hashed UID classifier field, a timestamp event field, and first and second behavior fields (e.g., actions taken by that UID), the dataset may be vertically partitioned into two: the first vertical partition may include the classifier field, the event field, and the first behavior field; while the second vertical partition may include the classifier field, the event field, and the second behavior field. Then, the dataset may be partitioned horizontally by hashed UID ranges (e.g., hashed UID is evenly distributed from 1-100 and the dataset is partitioned into horizontal partitions including hashed UID 1-10, 11-20 . . . 91-100). In the described 1-100 example, this would result in ten horizontal partitions; thus, the data would be partitioned into twenty shards. Note that in some preferred cases, the hashing algorithm enables data to be evenly distributed in such a scenario (due to uniform distribution of UIDs in hash space).

Shard partitioning may additionally or alternatively be performed in any manner. Each shard preferably has a shard index, and each shard index is preferably stored, along with the node on which the shard exists, in a configuration database. This linked data may be additionally or alternatively stored in any suitable location. Keeping a central list of shard and node links preferably enables the determination of the right nodes to query for particular data. The list of shard/node links may additionally include other information, such as a summary of data included in the shard. Additional examples of shard partitioning may be found in U.S. patent application Ser. No. 15/043,333, the entirety of which is incorporated by this reference.

In addition to partitioning shards by classifier field (or hashed classifier field), S132 preferably includes ordering data first by the classifier field (or hashed classifier field) and then by event field. Additionally or alternatively, S132 may include ordering data in any manner.

S132 preferably includes denormalizing data; that is, multiple copies of shards or data contained therein may be stored across nodes in a way that increases query or data access performance (e.g., shard copies may be stored on nodes distinct from the nodes where corresponding shard originals are stored).

Figure 4:
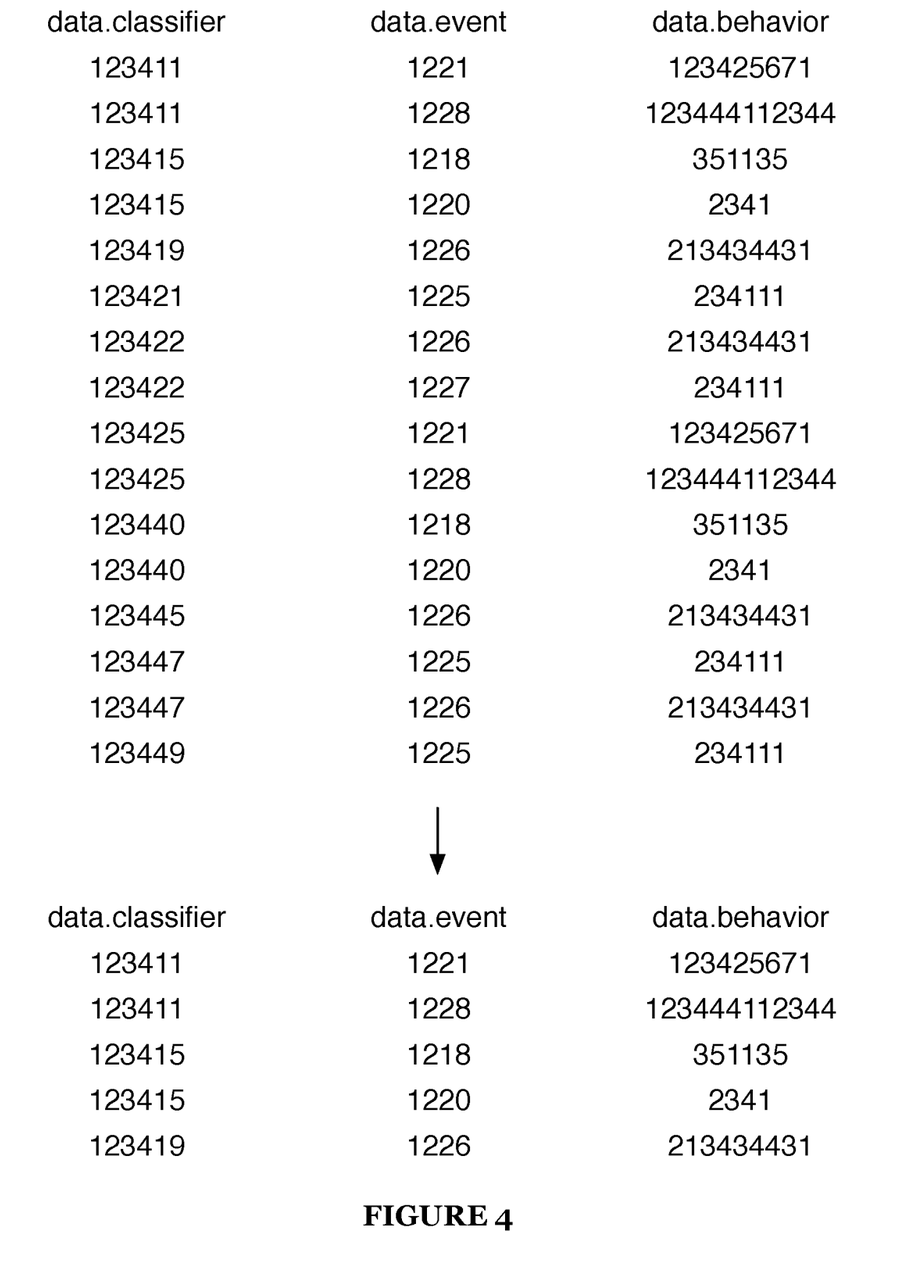
FIG. 4 is an exemplary table view of degraded-resolution shard copy generation of a method of an invention embodiment.

In an implementation of an invention embodiment, S132 includes generating degraded-resolution copies of data shards. In this implementation, preferably enabled by the classifier-then-event field sorting of the shards, S132 includes generating data shard copies that contain a subset of the data contained within the originals. For example, S132 may include creating a ¼ resolution copy of a data shard by taking ¼ (or approximately ¼) of the entries of the original and storing them in a new shard. In the case where data is sharded by hashed classifier field and sorted by hashed classifier-then-event fields, one example method of accomplishing this is simply dividing the hash space mapped to the shard into four and duplicating only data corresponding to the first fourth into the new shard. For example, a hash space mapped to a shard may include values ranging from 123410 to 123449 (and thus the first quarter, duplicated, ranges from 123410 to 123419) shown in FIG. 4.

Depending on a number of factors, including correlation in behavior between classifier values that are close to each other, and the extent to which co-located classifier values remain co-located in hash space, the degraded resolution copies may or may not be representative samples of their originals. However, S131 preferably includes selecting a hash function that results in degraded-resolution copies serving as representative samples of their originals. S131 may additionally or alternatively include verifying that degraded-resolution copies are representative samples of their originals by performing statistical analysis on the copies and/or originals. For example, a degraded-resolution copy may have values analyzed to see if the mean and standard deviation of data values are similar to those of the original.

In this implementation, S132 preferably includes generating a number of degraded resolution shard copies. For example, S132 may include creating two full-resolution shards, four ¼ resolution shards, and eight ⅛ resolution shards.

In the previous examples, S132 includes generating degraded resolution shard copies by segmenting the shard in shard space (i.e., dividing the shard into segments according to shard key ranges) and taking the first segment. Additionally or alternatively, S132 may include generating degraded resolution shard copies in any manner. For example, S132 may include over-segmenting shards; for example, S132 may include segmenting the shard in shard space into 16, and taking the first, fifth, ninth, and thirteenth segments to form a new shard copy (at ¼ resolution). S132 may additionally or alternatively include segmenting shards in any manner. Segments may be continuous (e.g., Segment 1 is from shard key value 0-99, Segment 2 is from shard key value 100-199, etc.) or discontinuous (e.g., Segment 1 is shard key values 0, 10, 20 . . . Segment 2 is shard key values 1, 11, 21 . . . etc.). Segments may be disjoint (i.e., no segment contains data present in any other segment) or overlapping (i.e., some data is shared between segments).

S132 preferably includes segmenting shards in such a manner that degraded-resolution copies only include whole classifier segments; that is, degraded-resolution copies select a subset of classifier fields, but include all data for those classifier fields. Alternatively, S132 may include segmenting shards across classifier segments; for example, S132 may include segmenting shards by entry (e.g., taking every tenth entry) instead of by classifier field value. Segmenting shards by entry may be performed in any manner. In addition to taking every nth entry, segmenting shards may be performed by taking a set number of entries per shard key (e.g., shard key 1 has the first, last, and middle value taken, shard key 2 has the first, last, and middle value taken, etc.) or in any other manner.

S132 may include performing analysis on shards to determine appropriate segmentation. For example, S132 may include segmenting a shard into eight segments and statistically analyzing them (e.g., measuring variance in behavior across segments). If it is determined that the segments have high variance, that level of segmentation may be deemed too high (e.g., ⅛ degraded resolution copies are no longer representative). Additionally or alternatively, a determination of high variance (or other statistical issues; e.g., the presence of outliers) may indicate other issues with the data. For example, if one shard segment is highly variant compared to the others, that may indicate that the shard segment contains anomalous data. If anomalous data is identified (for example, as described in U.S. patent application Ser. No. 15/043,333), the data may be structured in a manner distinct from other data. More generally, the resolution of degraded-resolution copies may be adjusted in any manner.

For example, an anomalously large classifier field value may have a state machine across that value created for it, with that state machine kept in cache and referenced for most queries (as opposed to the data itself). As another example, the anomalously large classifier field value may be flagged (such that it may be skipped during sampling) or data may even be re-sharded to isolate the anomalously large classifier field value.

S133 includes structuring data physically. S133 functions to structure data on disk or in memory to increase performance (e.g., by reducing query times). Data is preferably stored in persistent memory (e.g. hard disk drives, flash memory), but some or all of the data may be additionally or alternatively stored in temporary memory (e.g. RAM, processor cache).

To increase performance, S133 may include structuring data into large contiguous blocks. The size of these blocks is determined by a threshold cost; that is, blocks are preferably large enough that the processing cost (or time cost, etc.) of scanning a block of data is substantially larger than the cost of moving to the next data block.

S130 may additionally include structuring data physically (S133) according to a particular logical data structure (S132) or vice versa. For example, block size may be set (in S133) based on a particular data structure set in S132. As another example, shard size (S132) may be set based on a particular chosen block size (S133). S130 preferably includes structuring data logically and physically such that physical and logical data structures cooperatively increase scanning and/or query performance.

S140 includes storing the data according to the data structure (determined in S130) but may additionally or alternatively include storing data at any time for any purpose. Data is preferably stored in a columnar database on disk or in volatile memory, but may additionally or alternatively may be stored in any suitable database in any suitable physical location. Data stored by S140 is preferably event data, but may additionally or alternatively be any suitable data.

S150 includes measuring query performance. S150 functions to measure the effect of the data structure (determined in S130) on query speed and/or accuracy. Queries are preferably performed according to a sampling technique (e.g., that of U.S. patent application Ser. No. 14/644,081); in such an implementation, the quality of the query results may be determined by how efficiently queries are able to sample data such that the sample is representative of the population. In general, S150 may include measuring query speed (e.g., how long it takes the query to reach an answer with a particular confidence level) and/or quality (e.g., the confidence level of a query result after a set time). S150 may also include measuring the types of data queried and/or required to produce query results.

In the previously-mentioned classifier-then-event field ordering (or any classifier field based ordering), queries looking for data across a sample of classifier field values may utilize a technique called segment skipping to aid in capturing a representative sample. In this technique, a query may skip ahead some number of entries in a data shard from a first entry to a second entry and compare data in the first and second entries to determine information about the data in between those entries. In particular, segment skipping may be useful to identify (and account for) anomalous data. For example, if in the process of data sampling, a query encounters a segment containing only a single classifier field value (e.g., the classifier field value at the beginning and end of the segment is the same), data associated with that value may be considered anomalous (and potentially not sampled). S150 may include using the data from segment skipping to identify anomalous data (or otherwise learn about data distribution) passively through queries (instead of having to scan actively), increasing the efficiency of metadata collection. As another example, whenever segment skipping is performed, the beginning and end segment classifier values may be recorded. Across many segments (with knowledge of the segment size), data describing the relative size (in entries) of data associated with various classifier values may be estimated.

In a query, segment skipping may be performed automatically (e.g., periodically), in response to a detected event (e.g., detecting of a threshold number of identical classifier field values in a row), or in any manner. Queries may vary segment size in any manner (e.g., to increase efficiency of skipping anomalous data).

S160 includes restructuring the data. S160 functions to restructure data to increase query performance.

S160 preferably includes restructuring data according to query performance (e.g., query speed, accuracy, data location, sampling data, etc.) measured in S150. For example, S160 may include restructuring data to more evenly distribute query data across shards (e.g., by choosing different shard partitions). S160 may additionally or alternatively include re-hashing classifier fields (and re-partitioning based on the new hashing), selecting new classifier and/or event fields or otherwise modifying any aspect of data structure described in S130.

S160 may additionally or alternatively include restructuring data at any time, for any reason. For example, S160 may be performed upon reception of new data (e.g., that may require classifier field to be re-hashed) or upon expiration of a time condition. In this examples, query performance measured in S150 may or may not be used in the restructuring.

Likewise, S160 may include restructuring data in response to data aging or decreasing in usefulness. If data exceeds a threshold age (or drops below a threshold use metric), S160 may include modifying the data to be stored in degraded resolution (e.g., by removing full resolution copies and generating degraded resolution copies if they don't already exist). In one example, S160 may include modifying data simply by truncating the data (e.g., in hash space, as previously described in sections on shard segmentation).

As previously discussed, S160 may additionally or alternatively include restructuring data in response to identification of anomalous data (e.g., isolating an anomalous classifier in a particular shard).

The methods of the preferred embodiment and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for highly efficient data sharding comprising: with a first node of a distributed computer system that includes a plurality of remote nodes that each include a columnar database:
    receiving a dataset containing event data from a data source via a network connection;
    identifying a classifier field of the dataset;
    hashing data of the classifier field using a consistent hashing algorithm to generate a hashed classifier field;
    identifying an event field of the dataset;
    partitioning the dataset into shards using the hashed classifier field as a shard key;
    ordering data within each shard first by the classifier field and then by the event field;
    for each of the shards:
        dividing the shard into a plurality of segments based on at least one of: shard key, classifier field value, hash space, and entry,
        selecting a strict subset of the segments of the plurality of segments for use in queries, by performing at least one of: selection of a shard key segment, selection of a classifier field segment, selection of a hash space segment, selection of a half of the segments, selection of a quarter of the segments, selection of an eight of the segments, and selection of every other entry, and
        storing, in the columnar database of a remote node associated with the shard, a degraded-resolution shard copy of the shard that includes data that corresponds to the selected strict subset of the segments, and
    performing a first query according to a sampling technique by using only degraded-resolution shard copies stored in at least one of the columnar databases,
        wherein each degraded-resolution shard copy contains a strict subset of data contained by a corresponding shard.

2. The method of claim 1, further comprising modifying a resolution of a set of degraded-resolution shard copies in response to shard segment variance exceeding a threshold value.

3. The method of claim 1, further comprising identifying one shard of the shards as anomalous after identifying an anomalous classifier field value within the one shard; wherein degraded-resolution shard copies made of the one shard are distinct in structure from other shards of the shards.

4. The method of claim 1, further comprising restructuring the dataset in response to data of the dataset exceeding a threshold age; wherein restructuring the dataset comprises deleting full-resolution shards and leaving only degraded-resolution shard copies.

5. The method of claim 1, further comprising restructuring the dataset in response to usage of the dataset not meeting a threshold usage; wherein restructuring the dataset comprises truncating data of full-resolution shards.

6. A method for highly efficient data sharding comprising: with a distributed computing system that includes a plurality of nodes that each include a columnar database:
    receiving a dataset containing event data;
    identifying a classifier field of the dataset;
    identifying an event field of the dataset;
    partitioning the dataset into shards using the classifier field as a shard key;
    ordering data within each shard by the classifier field;
    for at least one of the shards:
        dividing the shard into a plurality of segments based on shard key,
        selecting one shard key segment of the plurality of segments for use in queries, and
        storing, in the columnar database of a remote node associated with the at least one shard, a degraded-resolution shard copy of the shard that includes data that corresponds to the selected segment, and
    performing a first query according to a sampling technique by using only degraded-resolution shard copies stored in at least one of the columnar databases,
    wherein the degraded-resolution shard copy of the at least one shard contains a strict subset of data contained by the at least one shard.

7. The method of claim 6, wherein the segments are continuous in shard space.

8. The method of claim 6, wherein the at least one shard contains additional classifier fields; wherein dividing the shard into a plurality of segments comprises selecting a subset of the additional classifier fields for each segment; wherein each segment includes all data present in the at least one shard and associated with the subset of the additional classifier fields for that segment.

9. The method of claim 6, wherein dividing the shard into a plurality of segments based on shard key comprises statistically analyzing the at least one shard to determine a segmentation scheme and dividing the shard into the plurality of segments according to the segmentation scheme.

10. A method for highly efficient data sharding comprising: with a distributed computing system that includes a plurality of nodes that each include a columnar database:
    receiving a dataset containing event data;
    identifying a classifier field of the dataset;
    hashing data of the classifier field using a consistent hashing algorithm to generate a hashed classifier field;
    identifying an event field of the dataset;
    partitioning the dataset into shards using the hashed classifier field as a shard key;
    ordering data within each shard by the hashed classifier field;
    for at least one of the shards:
        dividing the shard into a plurality of segments based on at least one of: shard key, classifier field value, hash space, and entry,
        selecting a strict subset of the segments of the plurality of segments for use in queries, by performing at least one of: selection of a shard key segment, selection of a classifier field segment, selection of a hash space segment, selection of a half of the segments, selection of a quarter of the segments, selection of an eight of the segments, and selection of every other entry, and
        storing, in the columnar database of a remote node associated with the at least one shard, a degraded-resolution shard copy of the shard that includes data that corresponds to the selected strict subset of segments, and
    performing a first query according to a sampling technique by using only degraded-resolution shard copies stored in at least one of the columnar databases.

11. The method of claim 10, wherein dividing the shard into a plurality of segments comprises dividing the shard into segments based on shard key; wherein the segments are continuous in shard space.

12. The method of claim 10, wherein dividing the shard into segments comprises dividing the shard into a plurality of segments based on classifier field values; wherein the segments are continuous in a space of classifier field values.

13. The method of claim 1, further comprising:
    measuring performance of the first query; and
    generating at least one new degraded-resolution shard copy according to at least the measured performance of the first query.

14. The method of claim 13, further comprising: performing statistical analysis on the received dataset to identify a distribution of field values within the received dataset, wherein identifying the classifier field comprises: identifying the classifier field based on the distribution of field values within the received dataset.

15. The method of claim 13, wherein dividing the shard into a plurality of segments comprises: dividing the shard into segments based on shard key, wherein the segments are continuous in shard space.

16. The method of claim 13, wherein dividing the shard into a plurality of segments comprises: dividing the shard into a plurality of segments based on classifier field values, wherein the segments are continuous in a space of classifier field values, wherein selecting a strict subset of the segments comprises selecting at least one whole classifier field segment.

17. The method of claim 13, wherein dividing the shard into a plurality of segments comprises: dividing the shard into a plurality of segments based on a hash space mapped to the shard.

18. The method of claim 17, wherein dividing the shard into a plurality of segments based on a hash space mapped to the shard comprises dividing the hash space into four quarters, and wherein selecting a strict subset of the segments comprises selecting one of the four quarters.

19. The method of claim 13, wherein dividing the shard into a plurality of segments comprises: dividing the shard into segments based on entry, and wherein selecting a strict subset of the segments comprises selecting every other entry.

20. The method of claim 1,
    wherein storing a degraded-resolution shard copy of a shard comprises: copying the strict subset selected from the shard to form the degraded-resolution shard copy of the shard, and storing the degraded-resolution shard copy of the shard in the columnar database of a remote node associated with the shard, wherein each stored degraded-resolution shard copy is physically structured on disk in a contiguous block, and
    wherein selecting a strict subset of the segments for a shard comprises: selecting a strict subset that is a representative sample of the shard.

* * * * *